US009737904B2

(12) United States Patent
Hung

(10) Patent No.: US 9,737,904 B2
(45) Date of Patent: Aug. 22, 2017

(54) CAULKING GUN

(71) Applicant: SIANG SYUAN FU ENTERPRISE CO., LTD., Hemei Township, Changhua County (TW)

(72) Inventor: Hung-Chih Hung, Changhua County (TW)

(73) Assignee: SIANG SYUAN FU ENTERPRISE CO., LTD., Hemei Township, Changhua County (TW)

( * ) Notice: Subject to any disclaimer, the term of this patent is extended or adjusted under 35 U.S.C. 154(b) by 90 days.

(21) Appl. No.: 14/963,932

(22) Filed: Dec. 9, 2015

(65) Prior Publication Data

US 2017/0165707 A1 Jun. 15, 2017

(51) Int. Cl.

*G01F 11/00* (2006.01)
*B05C 17/005* (2006.01)
*B05C 17/01* (2006.01)

(52) U.S. Cl.

CPC .... *B05C 17/00596* (2013.01); *B05C 17/0116* (2013.01)

(58) Field of Classification Search

CPC B05C 17/0596; B05C 17/0116; B05C 17/126
USPC .................. 222/391, 87; 184/37, 38.4, 38.1; 604/311, 224, 227; 74/144, 146, 167
See application file for complete search history.

(56) References Cited

U.S. PATENT DOCUMENTS 3,029,653 A * 4/1962 Nilsson ............... B05C 17/0126 222/391
6,386,401 B1 * 5/2002 Dodd ...................... B05C 17/01 222/391
6,640,998 B1 11/2003 Kern
2004/0267272 A1 * 12/2004 Henniges ........... A61B 17/8822 606/93
2005/0128867 A1 * 6/2005 Henniges ........... A61B 17/8822 366/139

FOREIGN PATENT DOCUMENTS

TW M406469 U 7/2011

* cited by examiner

*Primary Examiner* — Patrick M Buechner
*Assistant Examiner* — Jeremy W Carroll
(74) *Attorney, Agent, or Firm* — Muncy, Geissler, Olds & Lowe, P.C.

(57) ABSTRACT

A caulking gun includes a main body, a pushing rod, a pushing element, a bar-linkage assembly, and a trigger. The main body is formed with a handle extending downward. The pushing element and the bar-linkage assembly are arranged in the main body. The pushing rod is inserted through the main body and the pushing element. The bar-linkage assembly includes two bars aligned horizontally but not parallel to each other. One of the bars abuts against the pushing element. The trigger is pivotally disposed on the main body, and one end of the trigger abuts against a roller between the two bars. When the trigger is pulled, the roller is pushed upward by the trigger to push the pushing element forward via the bar-linkage assembly so that the pushing element inclines to bring the pushing rod move forward.

10 Claims, 9 Drawing Sheets

CAULKING GUN

BACKGROUND OF THE INVENTION

Field of the Invention

The present invention relates to a caulking gun.

Description of the Prior Art

A caulking gun is used to push the gel in the gel tube out. A conventional caulking gun, such as disclosed in patents TW M406469 or U.S. Pat. No. 6,640,998, has a pushing element, a bar-linkage assembly, and a trigger which is connected with the bar-linkage assembly. When the trigger is pressed or pulled, the pushing element is moved due to the motion of the bar-linkage assembly so as to bring a pushing rod move forward. Specifically, the trigger is directly pivotally engaged with one of the bars of the bar-linkage assembly. The motion of the bar-linkage assembly is triggered by the pivoting of the trigger.

However, the angle of pivoting and the position of the trigger are restricted, so the design of movement of the bars is also restricted a lot. Besides, the pressing force of the trigger may be wasted on useless component of force in the complicated bar-system. To move the pushing rod forward, much force is needed.

On the other hand, the complicated bar-system is difficult to manufacture and assemble. The connections between the bars may be stuck due to rusting.

SUMMARY OF THE INVENTION

The main object of the present invention is to provide a caulking gun which has a simple structure and is easier to use.

To achieve the above and other objects, a caulking gun of the present invention includes a main body, a pushing rod, a pushing element, a bar-linkage assembly, and a trigger.

The main body has a first end and a second end. The main body has an operation portion. A lower portion of the operation portion near the second end is formed with a handle extending downward. A pushing rod penetrates the operation portion along a direction from the second end to the first end. An end of the pushing rod near the first end is adapted for pushing a gel in a gel tube.

A pushing element is received in the operation portion and tends to move toward the second end under an elastic force of a first elastic element. The pushing element is formed with a first through hole whose internal diameter is larger than ax external diameter of the pushing rod. The pushing rod is inserted through the first through hole. The pushing element has an abutting portion at a face thereof facing the second end. The abutting portion is located below the first through hole.

The bar-linkage assembly includes a front bar and a rear bar. An end of the rear bar is pivotally connected to a portion of the operation portion near the second end. An end of the front bar is pivotally connected to the rear bar. An end of the front bar away from the rear bar abuts against the abutting portion of the pushing element.

The trigger has a pressing end and a pushing end at two opposite ends thereof. The pressing end is more remote from the operation portion than the pushing end. The pushing end is inserted into the operation portion. The trigger is pivotally connected to the operation portion at a portion between the pressing end and the pushing end but closer to the pushing end than the pressing rod. The pushing end is able to drive a connection between the front bar and the rear bar to move upward.

When the pressing end of the trigger is pressed toward the handle, the pushing end pushes the connection between the front bar and the rear bar upward so that the front bar pushes the abutting portion of the pushing element toward the first end. Thereby the pushing element inclines much with respect to the pushing rod so that the pushing rod is grasped by the first through hole. And then the pushing element is further moved toward the first end to drive the pushing rod to move toward the first end when the trigger is further pressed.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
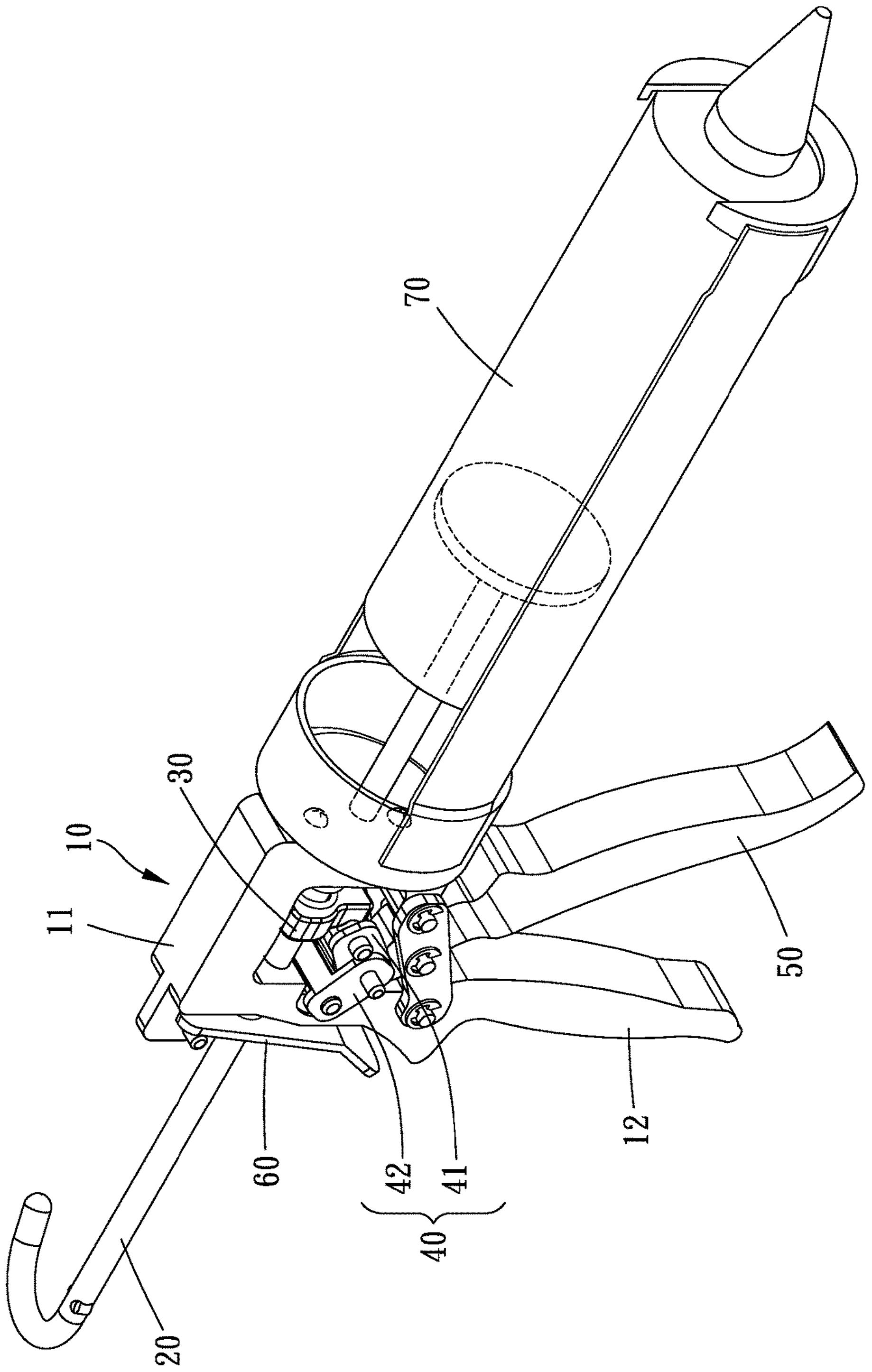
FIG. 1 is a stereogram of the present invention.
Figure 2:
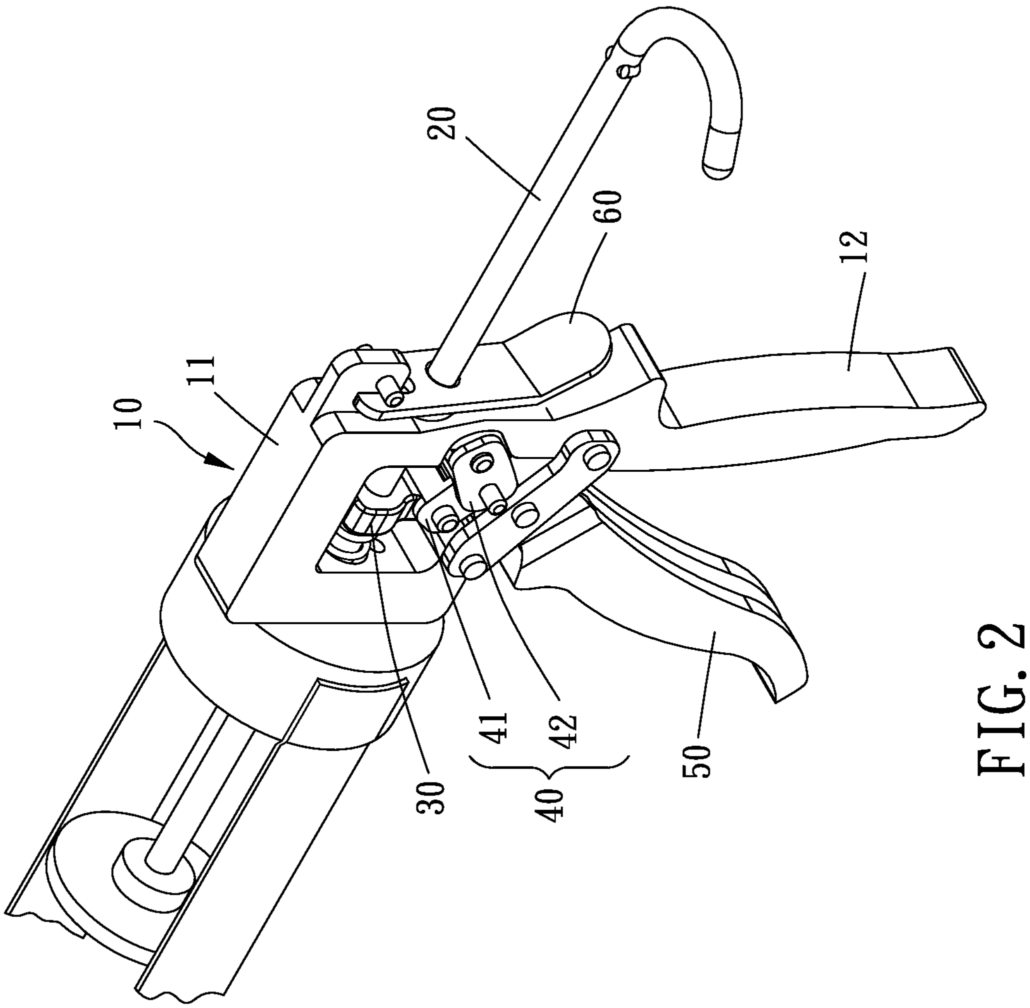
FIG. 2 is a stereogram of the present invention at another angle.
Figure 3:
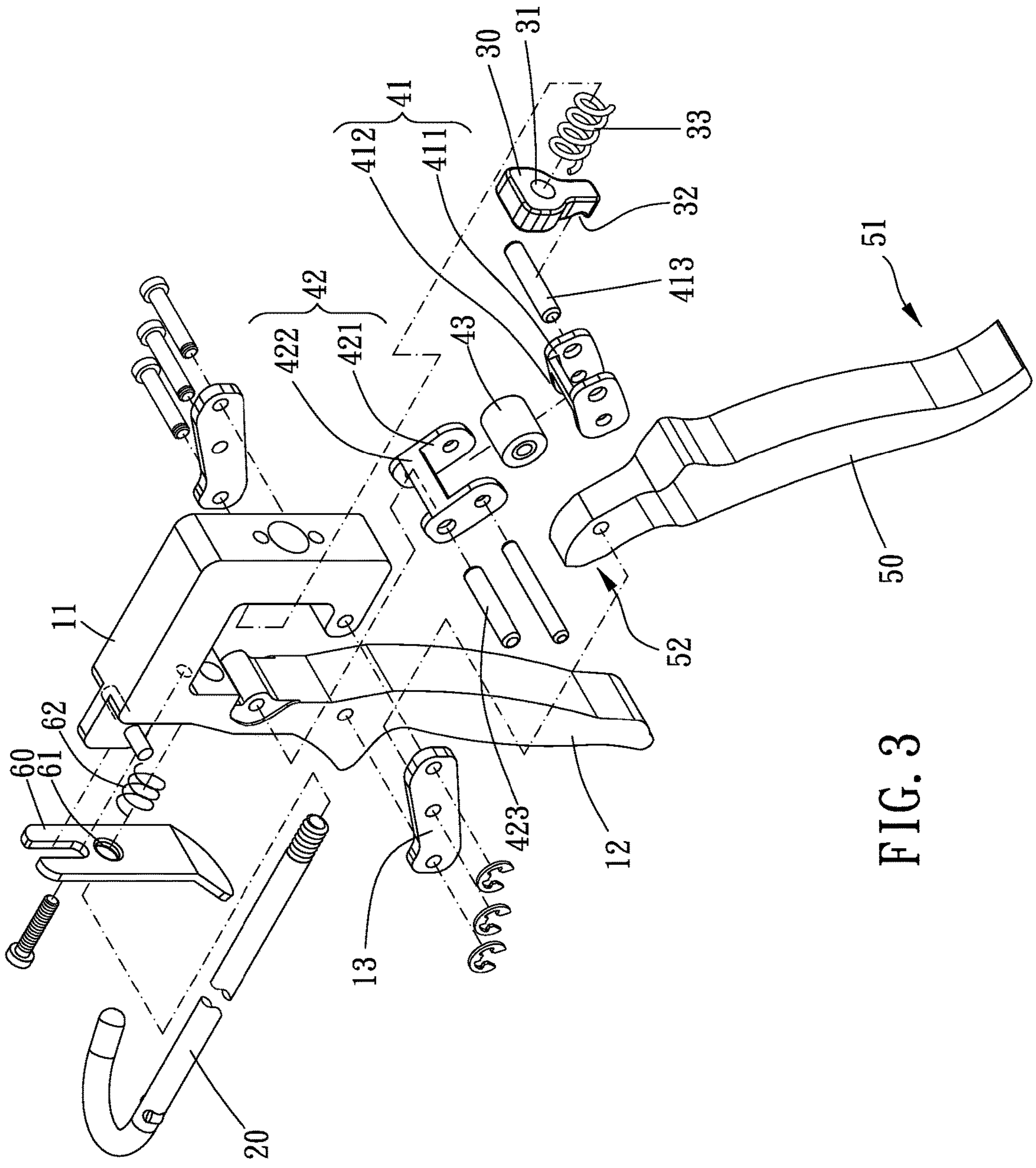
FIG. 3 is a breakdown drawing of the present invention.
Figure 4:
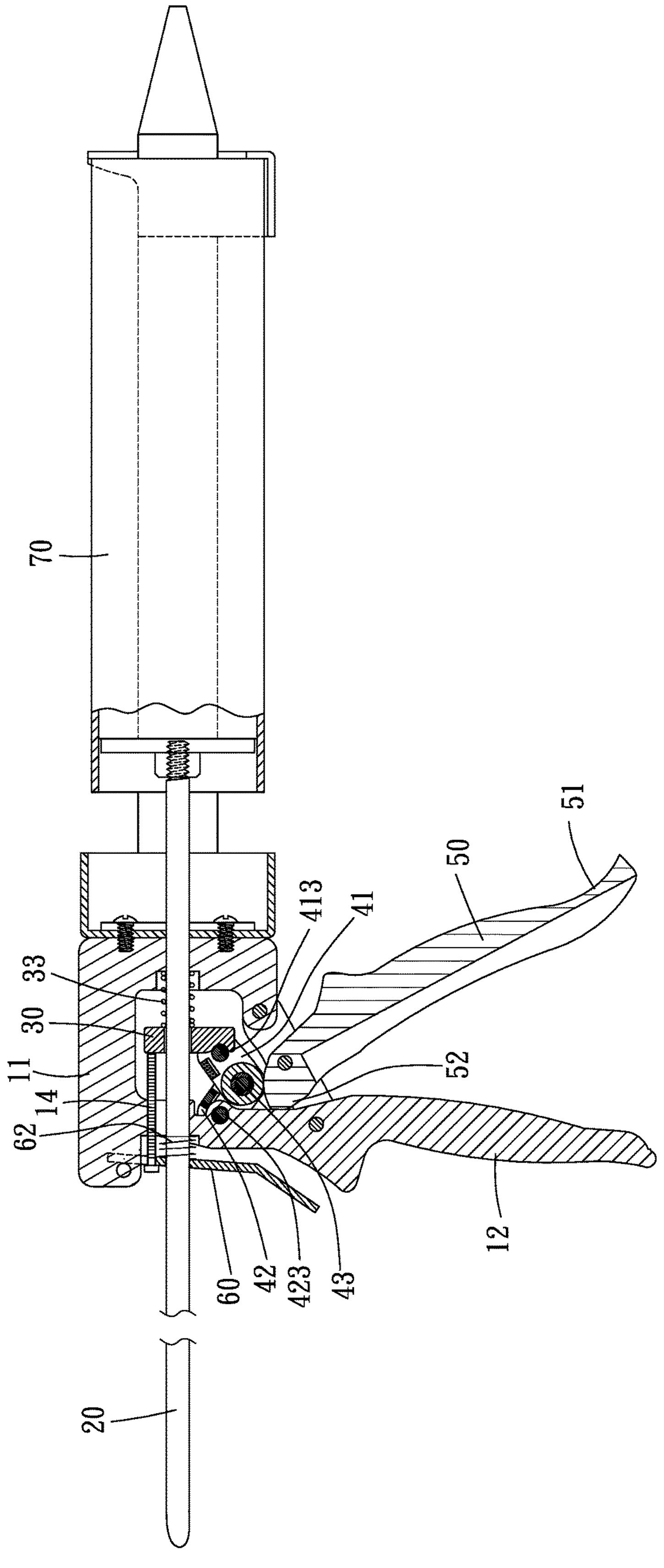
FIG. 4 is a profile of the present invention.

Please refer to FIG. 1 to FIG. 5, the caulking gun of the present invention includes a main body 10, a pushing rod 20, a pushing element 30, a bar-linkage assembly 40, a trigger 50, and a restriction element 60.

The main body 10 has a first end and a second end. The main body 10 has an operation portion 11. The operation portion 11 is formed with a handle 12 extending downward from a lower portion thereof near the second end. In the present embodiment, the lateral view of the operation portion 11 is substantially reversed U-shaped. An opening is formed between the upper end of the handle 12 and the lower portion of the operation portion 11 near the first end. The upper end of the handle 12 and the lower portion of the operation portion 11 near the first end are connected by a connecting piece 13.

The pushing rod 20 penetrates the operation portion 11 along a direction from the second end to the first end. An end of the pushing rod 20 near the first end is adapted for pushing a gel in a gel tube 70 out.

The pushing element 30 is received in the operation portion 11 and tends to move toward the second end under the elastic force by a first elastic element 33. The pushing element 30 is formed with a first through hole 31 whose internal diameter is larger than an external diameter of the pushing rod 20. The pushing rod 20 is inserted through the first through hole 31. The pushing element 30 has an abutting portion on a face opposite to the first elastic element 33. The abutting portion is located below the first through hole 31. In the present embodiment, the operation portion 11 has a blocking element 14 near the second end. The blocking element 14 abuts against the upper portion of the pushing element 30 so that the upper portion of the pushing element 30 may not be over-pushed toward the second end by the elastic element 33.

The bar-linkage assembly 40 includes a front bar 41, a rear bar 42, and a roller 43. An end of the rear bar 42 is pivotally connected to the portion of the operation portion 11 near the second end. An end of the front bar 41 is pivotally connected to the rear bar 42. The roller 43 is arranged at the connection between the front bar 41 and the rear bar 42. An end of the front bar 41 away from the rear bar 42 abuts against the abutting portion of the pushing element 30. More specifically, the end of the front bar 41 away from the rear bar 42 has a traversing axle 413. The abutting portion of the pushing element 30 is a groove 32. The traversing axle 413 is received in the groove 32. An angle is defined by the top faces of the front bar 41 and the rear bar 42 therebetween. The rear bar 42 is pivotally connected to the operation portion 11 by a pivot axle 423. In the present embodiment, each of the front bar 41 and the rear bar 42 is composed of two side portions 411, 421 and a bridge portion 412, 422 connecting the two side portion 411, 421 therebetween.

The trigger 50 has a pressing end 51 and a pushing end 52 at two opposite ends. The pressing end 51 is more remote from the operation portion 11 than the pushing end 52. The pushing end 52 is inserted into the operation portion 11. A portion of the trigger 50 between the pressing end 51 and the pushing end 52 but closer to the pushing end 52 is pivotally connected to the operation portion 11. In the present embodiment, the trigger 50 is pivotally connected to the connecting piece 13. The pushing end 52 abuts against the roller 43. When the trigger 50 is pressed to push the roller 43 upward, the distance between the pivot axle 423 and the traversing axle 413 increases, and the angel between the front bar 41 and the rear bar 42 is also increased. Preferably, the angle is 90 to 120 degrees when the trigger 50 is not pressed.

Figure 6:
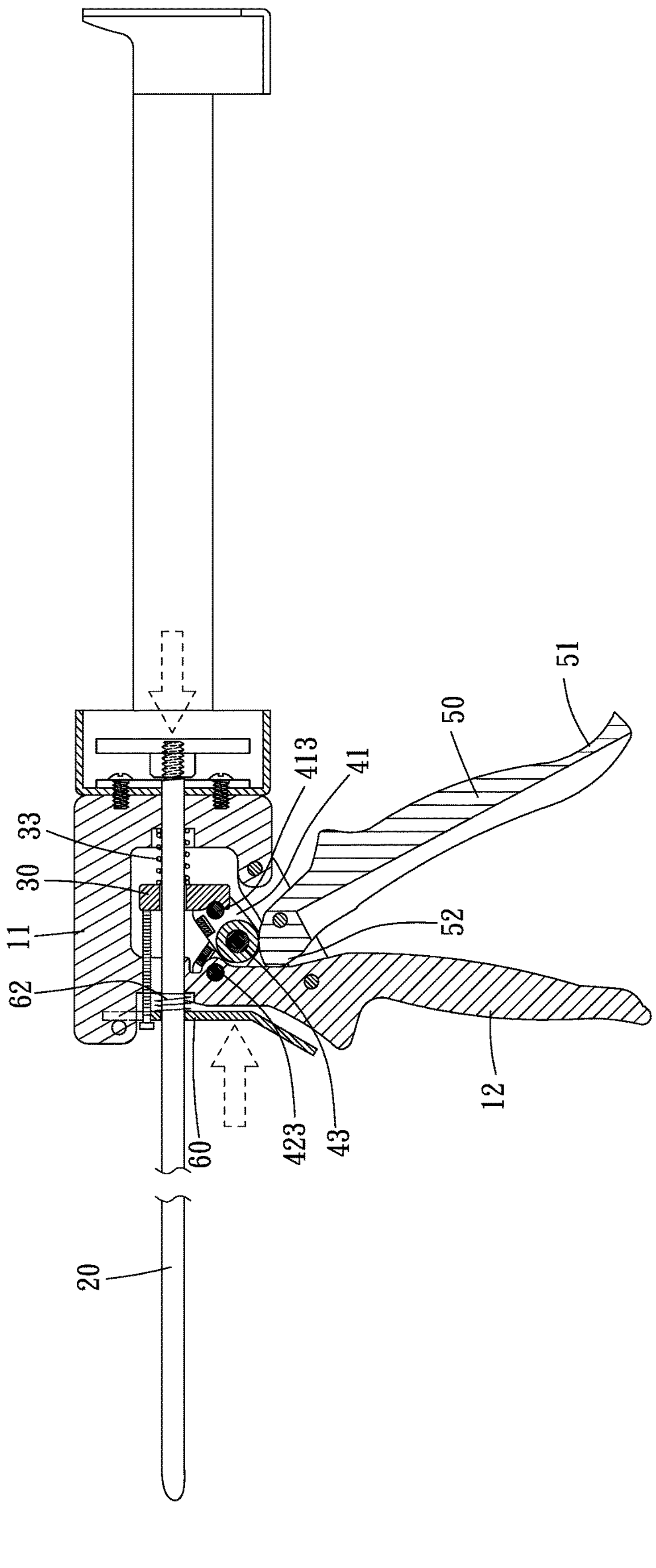
FIG. 6 is a profile of the present invention when a restriction element is pressed.

The restriction element 60 is arranged at the second end of the main body 10 to conditionally restrict the pushing rod 20 from being pulled toward the second end. In the present embodiment, the restriction element 60 has a second through hole 61, and the pushing rod 20 is inserted through the second through hole 61. The second through hole 61 has an internal diameter larger than the external diameter of the pushing rod 20. A second elastic element 62 is biased between the restriction element 60 and the operation portion 20. An upper portion of the restriction element 60 is positioned to the main body 10 so that a lower portion of the restriction element 60 is pivotable. The lower portion of the restriction element 60 tends to move away from the main body 10 due to the second elastic element 62. When the lower portion of the restriction element 60 is not pressed toward the main body 10, the second through hole 61 inclines with respect to the pushing rod 20 so as to grasp the pushing rod 20. When the lower portion of the restriction element 60 is pressed toward the main body 10, the second through hole 61 inclines less so that the pushing rod 20 is not positioned by the second through hole 61, as shown in FIG. 6. Preferably, an end of the second through hole 61 near the main body 10 has a larger internal diameter than an internal diameter of an end of the second through hole 61 remote from the main body 10. When the restricted element 60 is not pressed, the pushing rod 20 is able to be moved toward the first end but unable to be moved toward the second end. Besides, the pushing rod 20 is inserted through the first elastic element 33 and the second elastic element 62 so that the first elastic element 33 and the second elastic element 62 may abut against the fringes of the first through hole 31 and the second through hole 61.

Figure 5:
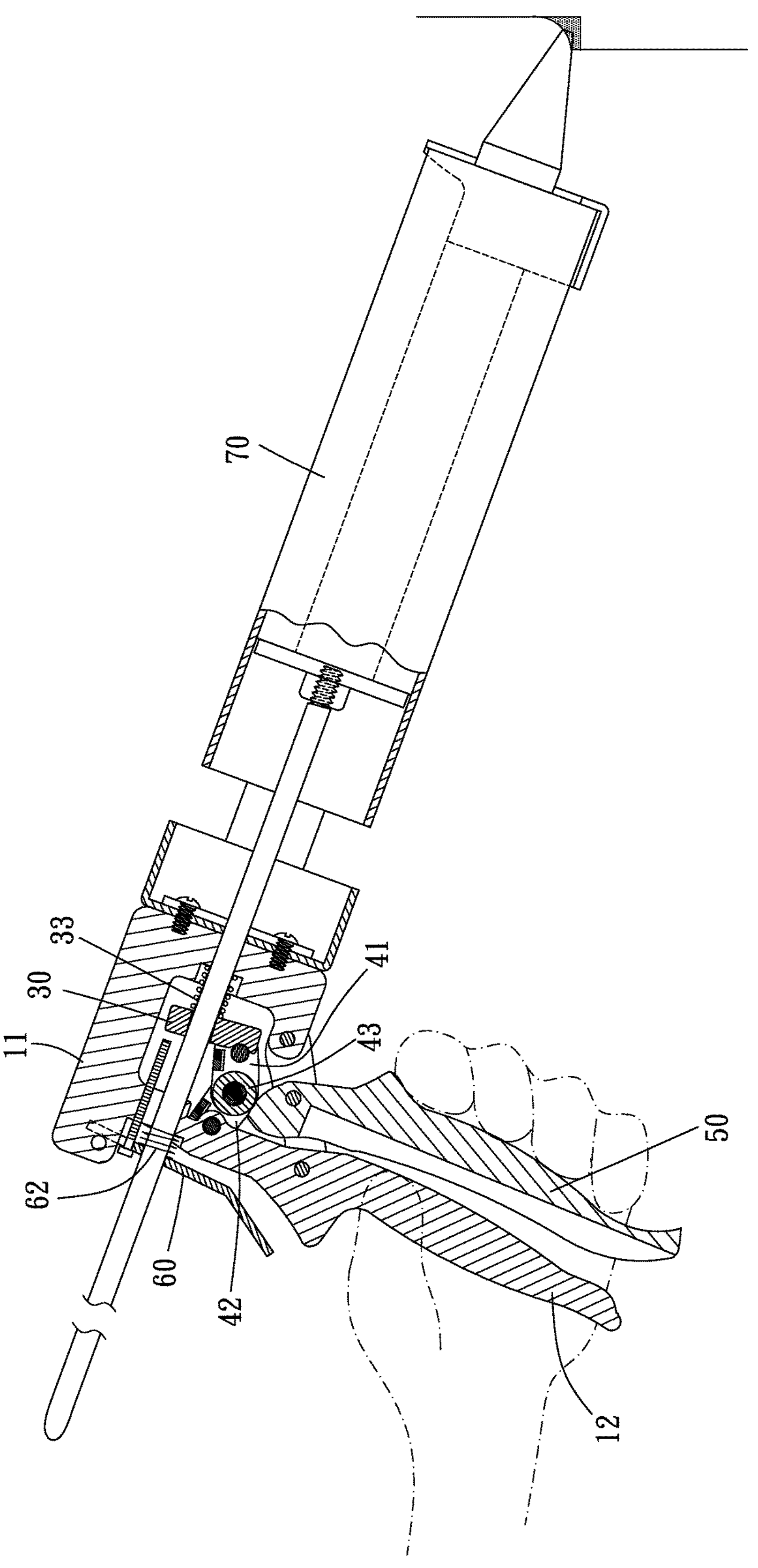
FIG. 5 is a profile of the present invention when a trigger is pressed.

When the pressing end 51 of the trigger 50 is pressed toward the handle 12, as shown in FIG. 5, the roller 43 is pushed upward by the pushing end 52 so that the front bar 41 pushes the abutting portion of the pushing element 30 toward the first end. Thus, the pushing element 30 inclines much with respect to the pushing rod 20, so the pushing rod 20 is grasped by the first through hole 31. At this time, the pushing element 30 is further moved toward the first end when the trigger 50 is further pressed. Thereby the pushing rod 20 is brought to move toward the first end to push the gel in the gel tube 70 out. When the pushing rod 20 cannot be pushed anymore, the user can press the restriction element 60 and pull the pushing rod 20 toward the second end to resume the pushing rod 20 to a original position.

Figure 7:
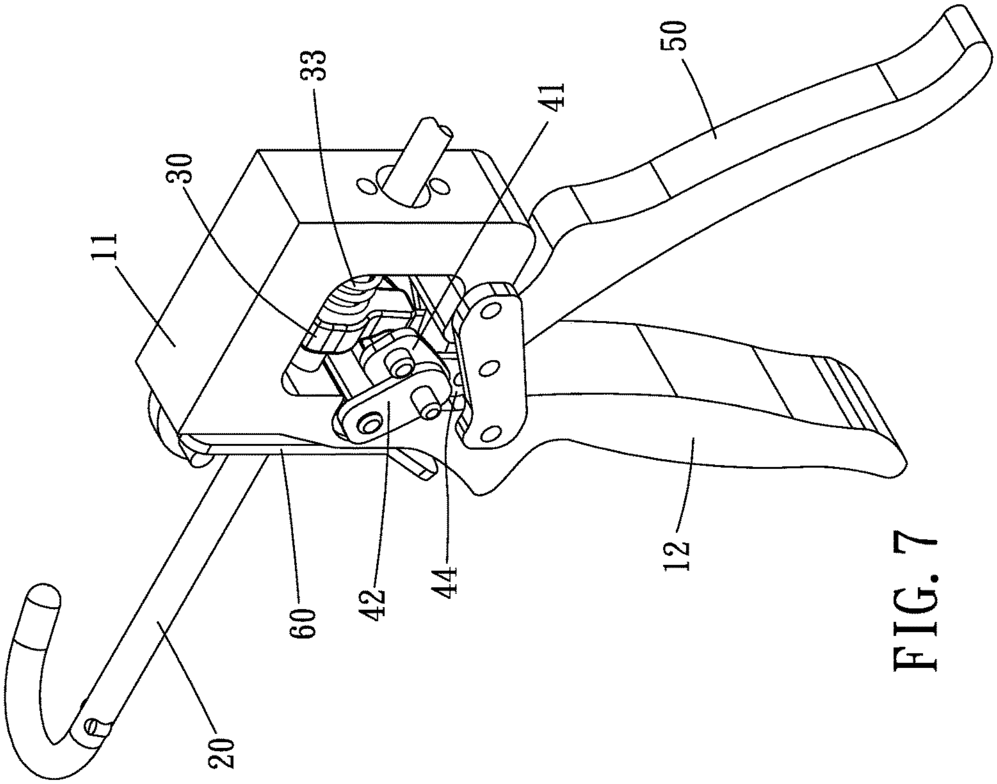
FIG. 7 is a stereogram showing a second embodiment of the present invention.
Figure 8:
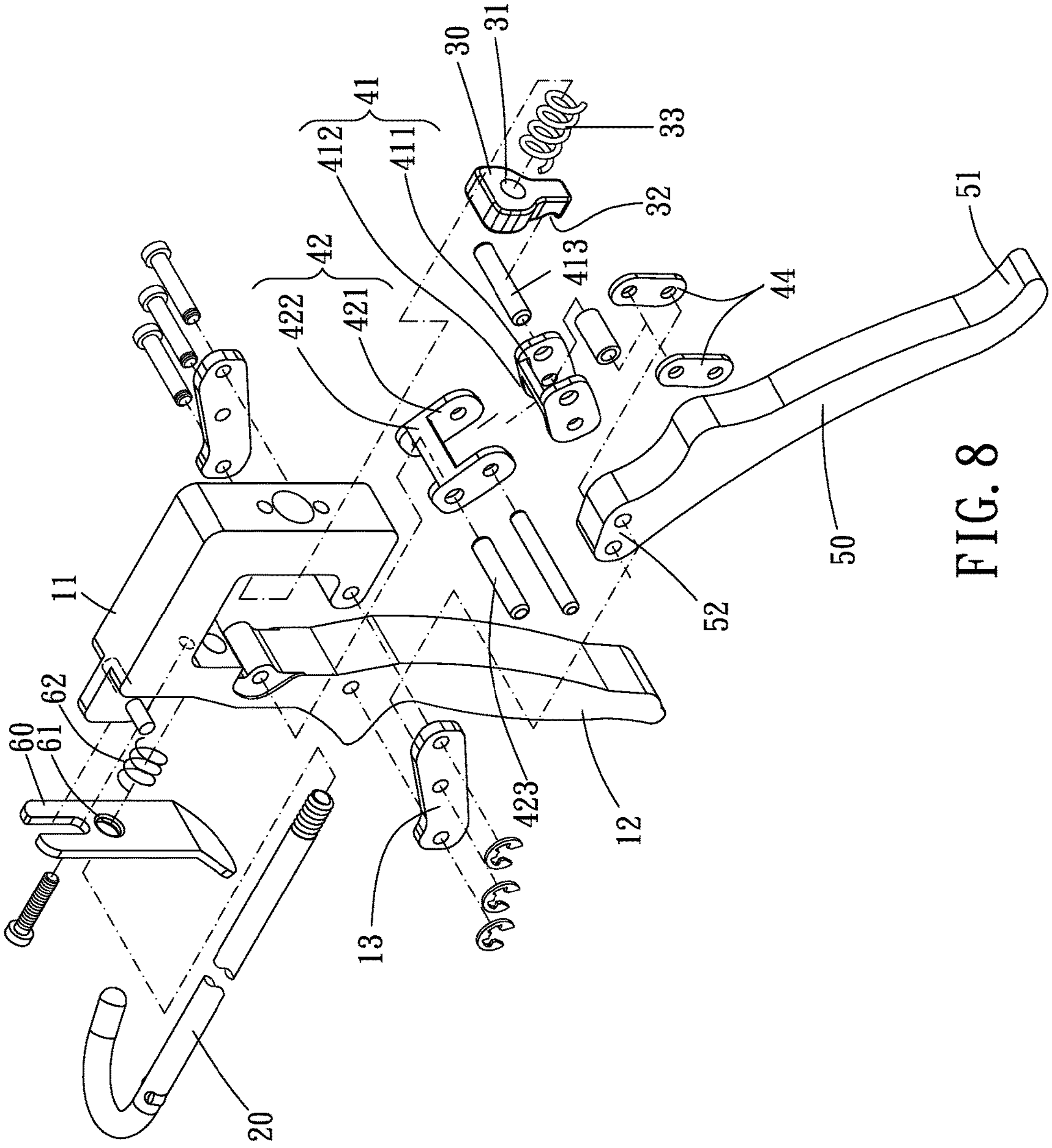
FIG. 8 is a breakdown drawing showing a second embodiment of the present invention.
Figure 9:
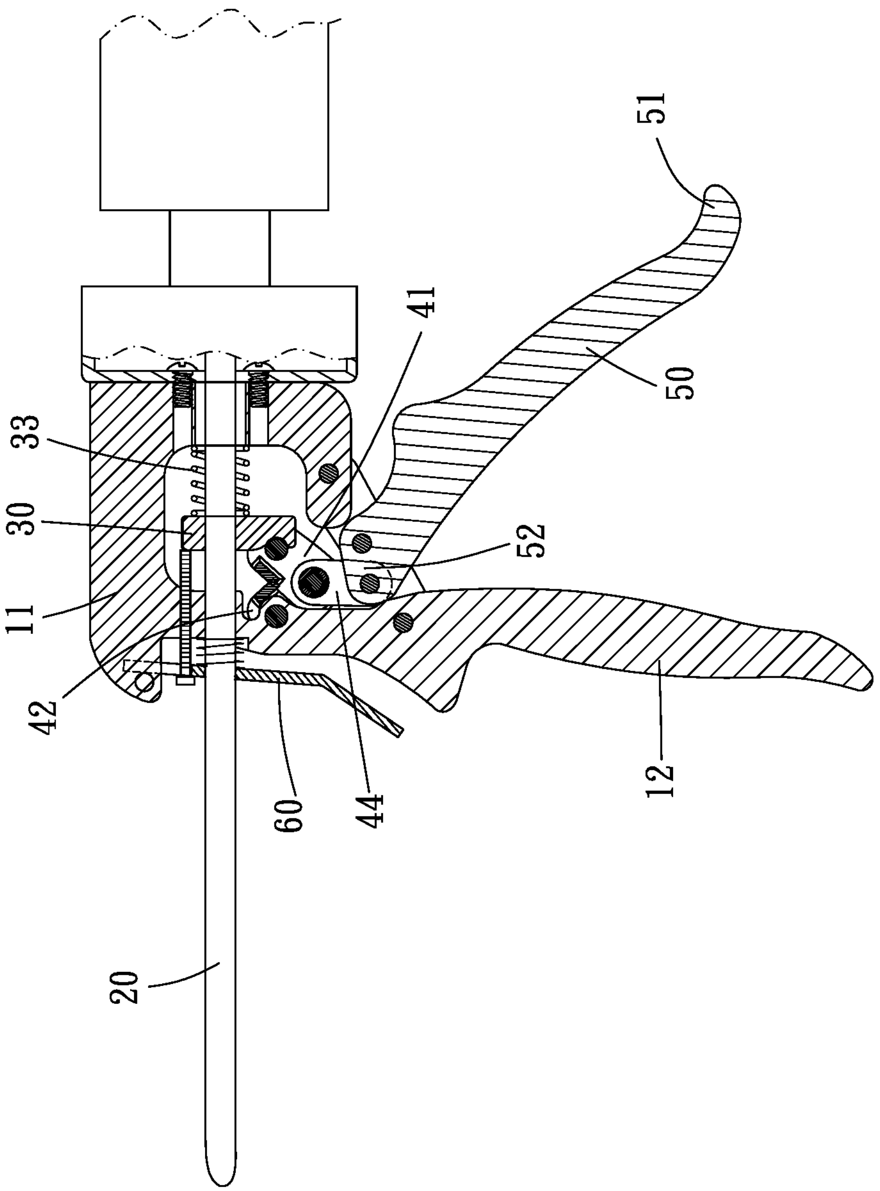
FIG. 9 is a profile showing a second embodiment of the present invention.

In another embodiment, as shown in FIGS. 7 to 9, the roller is replaced by a pushing piece 44. An end of the pushing piece 44 is pivotally connected to the connection between the front bar 41 and the rear bar 42, and the other end of the pushing piece 44 is pivotally connected to the pushing end 52 of the trigger 50. When the trigger 50 is pressed, the pushing end 52 drives the pushing piece 44 to move upward so that the connection between the front bar 41 and the rear bar 42 is moved upward. Thus, by a motion of the bar-linkage assembly similar to the first embodiment, the pushing rod 20 is moved forward.

In conclusion, the caulking gun of the present invention wastes less force in the bar-linkage system. Besides, the structure is simple and easy to manufacture and assemble.

What is claimed is:

1. A caulking gun, including:

a main body, having a first end and a second end, the main body having an operation portion, a lower portion of the operation portion near the second end being formed with a handle extending downward;

a pushing rod, penetrating the operation portion along a direction from the second end to the first end, an end of the pushing rod near the first end being adapted for pushing a gel in a gel tube;

a pushing element, received in the operation portion, tending to move toward the second end under an elastic force of a first elastic element, formed with a first through hole whose internal diameter is larger than an external diameter of the pushing rod, the pushing rod being inserted through the first through hole, the pushing element having an abutting portion at a face thereof facing the second end, the abutting portion being located below the first through hole;

a bar-linkage assembly, including a front bar and a rear bar, an end of the rear bar being pivotally connected to a portion of the operation portion near the second end, an end of the front bar being pivotally connected to the rear bar, an end of the front bar away from the rear bar abutting against the abutting portion of the pushing element;

a trigger, having a pressing end and a pushing end at two opposite ends thereof, the pressing end being more remote from the operation portion than the pushing end, the pushing end being inserted into the operation portion, the trigger being pivotally connected to the operation portion at a portion between the pressing end and the pushing end but closer to the pushing end than the pressing rod, the pushing end being able to drive a connection between the front bar and the rear bar to move upward;

wherein when the pressing end of the trigger is pressed toward the handle, the pushing end pushes the connection between the front bar and the rear bar upward so that the front bar pushes the abutting portion of the pushing element toward the first end, thereby the pushing element inclines much with respect to the pushing rod so that the pushing rod is grasped by the first through hole, then the pushing element is further moved toward the first end to drive the pushing rod to move toward the first end when the trigger is further pressed.

2. The caulking gun of claim 1, wherein the first elastic element is biased between the operation portion and a face of the pushing element facing to the first end, the bar-linkage assembly further includes a roller, the roller is arranged at the connection between the front bar and the rear bar, the pushing end of the trigger abuts against the roller, the front bar has a traversing axle at the end away from the front bar, the abutting portion of the pushing element is a groove, the traversing axle is received in the groove.

3. The caulking gun of claim 2, wherein an angle is defined by topsides of the front bar and the rear bar, the rear bar is pivotally connected to the portion of the operation portion near the second end by a pivot axle, when the trigger is pressed to push the roller upward, a distance between the pivot axle and the traversing axle increases, and the angle also increases.

4. The caulking gun of claim 3, wherein the angle is 90-120 degrees when the trigger is not pressed.

5. The caulking gun of claim 1, further includes a restriction element, the restriction element being disposed at the second end of the main body to conditionally restrict the pushing rod from being pulled toward the second end, the restriction element having a second through hole, the pushing rod penetrating the second through hole, the second through hole having an internal diameter larger than the external diameter of the pushing rod, a second elastic element being biased between the restriction element and the operation, an upper portion of the restriction element being positioned on the main body to allow a lower portion of the restriction element to pivot, the lower portion of the restriction element tending to move away from the main body due to the second elastic element, the second through hole inclining with respect to the pushing rod to grasp the pushing rod when the lower portion of the restriction element is not pressed toward the main body, the second through hole inclining less with respect to the pushing rod when the lower portion of the restriction element is pressed toward the main body so that the pushing rod is not restricted by the second through hole.

6. The caulking gun of claim 5, wherein an internal diameter of an end of the second through hole near the main body is larger than an internal diameter of an end of the second through hole remote from the main body, the pushing rod is able to be pulled toward the first end but unable to be pulled toward the second end when the restriction element is not pressed.

7. The caulking gun of claim 1, wherein a blocking element is arranged in the operation portion near the second end, the blocking element is adapted for abutting against an upper portion of the pushing element so that the upper portion of the pushing element is unable to be pushed too much toward the second end by the first elastic element.

8. The caulking gun of claim 1, wherein each of the front bar and the rear bar is composed of two side portions and a bridge portion connecting the two side portions therebetween.

9. The caulking gun of claim 1, wherein the pushing rod penetrates the first elastic element and the second elastic element.

10. The caulking gun of claim 1, wherein a lateral view of the operation portion is substantially reversed U-shaped, an opening is formed between an upper portion of the handle and the lower portion of the operation portion near the first end, the upper portion of the handle and the lower portion of the operation portion near the first end are connected by a connecting piece, the trigger is pivotally disposed on the connecting piece.

* * * * *